Jan. 17, 1950 R. A. HENDERSON 2,495,062
ELECTRICAL CAPACITOR
Filed Oct. 1, 1945

INVENTOR.
Roy A. Henderson
BY
ATTORNEY

Patented Jan. 17, 1950

2,495,062

UNITED STATES PATENT OFFICE 2,495,062

ELECTRICAL CAPACITOR

Roy A. Henderson, West Collingswood, N. J., assignor to Radio Corporation of America, a corporation of Delaware Application October 1, 1945, Serial No. 619,707

7 Claims. (Cl. 175—41)

This invention relates to a new and useful electrical capacitor which is particularly adapted for use as a radio frequency by-pass instrument or meter capacitor.

An object of this invention is to provide an improved low cost capacitor having a minimum or zero lead length.

A feature of this invention is the novel arrangement of a dielectric sheet having a metallic electrode positioned on each face of the dielectric sheet, the electrodes and dielectric sheet being bound together by a cover to form a capacitor unit, the cover having a cut-away portion which provides opposite exposed faces on each electrode to give a direct electrical connection from each electrode to the terminals of a meter.

Electrical indicating instruments or meters are subject to damage when radio frequency currents flow through them inadvertently. It is customary to guard against such damage by connecting a radio frequency by-pass capacitor across the meter connection studs. This is usually satisfactory in the ordinary lower range of radio frequencies, but I have found that it often fails to provide ample protection at the very high frequencies. This failure can be attributed, in part, to the inductance of the capacitor leads. My invention discloses a capacitor in which all the leads have been eliminated.

This invention will best be understood by referring to the accompanying drawing in which.

Figure 1:
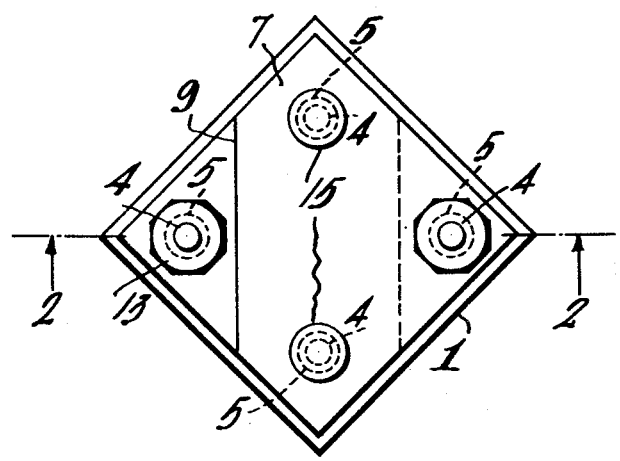
Fig. 1 is a plan view of the capacitor of this invention.
Figure 2:
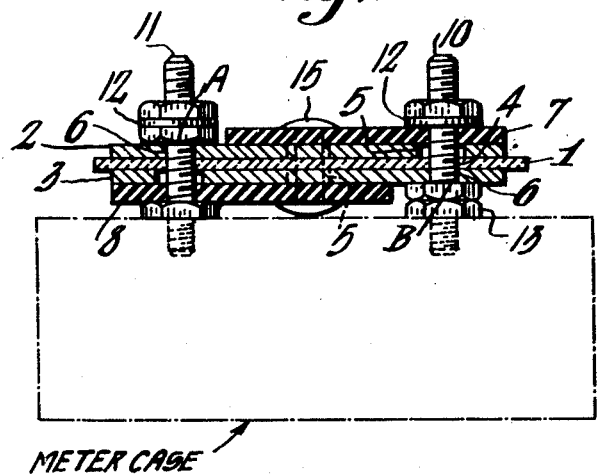
Fig. 2 is a cross section of Fig. 1 taken on line 2—2.

Referring now in detail to the drawing, a dielectric sheet 1 which is composed of any suitable low-loss dielectric material, such as, for example, mica, has located on each face a metallic brass or copper silver plated plate 2 and 3. Near each corner of the dielectric sheet 1, there are located small circular apertures 4. The metallic plates 2 and 3 have also located near each corner, similar circular apertures which are arranged to be in exact register with the apertures 4 located in the dielectric sheet 1, the only difference being that three of the apertures on each plate are made larger as indicated by the large circular aperture 5. The remaining apertures 6 are of approximately the same size as that of apertures 4, and as will be seen by referring to Fig. 2, these apertures 6 are positioned on the dielectric sheet diagonally opposite each other. Insulating cover plates 7 and 8 of "bakelite" or other suitable electrical insulation are positioned on each side of the plates 2 and 3, each of the cover plates having a cut-away portion 9 which is assembled on each opposite face of the metallic electrodes, the cut-away portion being arranged to permit an electrical connection to be made directly to the surface of metal plates 2 and 3. This connection is indicated by the broken lines which include the meter studs 10 and 11, washers 12 and nuts 13. It will be noted that in order for the condenser to set parallel to the meter case, an extra washer 12 or a nut 13 is provided for the meter stud 10, to make up for the differences in the cut-away portion of member 8. The dielectric sheet, metallic electrodes and cover plates are bound together to form a single condenser unit, by any suitable means such as, for example, metallic rivets or eyelets 15, and it will be noted that where the rivets 15 pass through, the metallic plates are sufficiently insulated to prevent a short circuit between each other by the provision of the space between the rivets 15 and the large apertures 5 indicated by the dotted lines in both Figs. 1 and 2.

In the operation of this device, the assembly of the complete unit is such that the capacitor may be mounted directly to the meter studs 10. Loose metal washers or nuts may be provided to give a uniform thickness when the connection nuts 13 are tightened on the meter studs. It will be noted that with this specific arrangement, the flow of the radio frequency current through the capacitor unit is from point A (shown in Fig. 2) to the metal electrode sheet 2, through the mica, and thence through metal electrode plate 3 to point B. With this arrangement, there are no leads or even connection members from the meter studs to the metallic electrodes. Thus, the radio frequency path is substantially zero.

This capacitor may be used for connection to devices other than electrical meters.

What is claimed is:

1. A radio frequency by-pass capacitor comprising a rectilinear mica dielectric sheet, a rectilinear metal plate electrode of slightly smaller area than said dielectric sheet positioned on each face of said mica sheet, a five-sided insulating cover for each one of said metal plates, the arrangement of said cover being such as to provide an exposed area on said metal plates which permits the making of a direct electrical connection at opposite corners of said capacitor to each metallic plate electrode, and means to bind said mica sheet, metal plate electrodes and covers together to form a capacitor unit.

2. A radio frequency by-pass capacitor comprising a dielectric sheet, a metal plate electrode positioned on each face of said dielectric sheet, an insulating cover for each one of said metal plates, the arrangement and the shape of said cover being such as to provide oppositely exposed areas on said metal plates which permit the making of an electrical connection directly to each metallic plate electrode, and means including metallic rivets spaced away from said metallic plates to bind said dielectric sheet, metal plates and covers to form a unit.

3. A radio frequency by-pass capacitor comprising a dielectric sheet having a plurality of apertures therein, a plurality of rivets, a metal plate electrode positioned on each face of said dielectric sheet, an insulating cover for each one of said metal plates, the arrangement and the shape of said cover being such as to provide an oppositely exposed area on each one of said metal plates which permit the making of an electrical connection directly to each metal plate electrode, and means including said rivets passing through said apertures to bind said dielectric sheet, metal plates and covers together to form a unit.

4. A radio frequency by-pass capacitor comprising a dielectric sheet having a plurality of apertures therein, a metal electrode having apertures therein located on each face of said dielectric sheet and arranged to register with apertures in said sheet, an insulating cover plate located on one face of each metal electrode with apertures, to register with apertures in said dielectric sheet, the arrangement and shape of said cover plate being such as to provide an exposed area on each metal electrode, and a plurality of metal eyelets each one passing through some of the apertures in said dielectric sheet, metal electrodes and cover plates to insulatingly bind them together to form a unit the other apertures in said dielectric sheet electrode and cover plate being arranged to permit the passage of terminal studs of a radio frequency meter therethrough, whereby an electrical connection is directly made from the meter to the exposed area of said metal electrodes.

5. A radio frequency instrument by-pass capacitor comprising a rectilinear dilectric sheet having apertures therein, each one of which is located near a corner of said dielectric sheet, a metallic electrode positioned on each face of said dielectric sheet with apertures arranged to register with the apertures in said dielectric sheet, an insulating cover for each one of said metallic plates, the arrangement and shape being such as to provide an exposed area on said metal plates to permit the making of an electrical connection to said capacitor directly to each metallic plate electrode, and metallic binding means passing through said dielectric sheet, metallic plates and covers to bind them together to form a unit, some of the apertures in the metal plates being made larger to provide insulation between the binding means and said metallic plates.

6. A radio frequency by-pass capacitor comprising a dielectric sheet having a plurality of apertures therein; a pair of metal electrodes each having a plurality of apertures therein which register with the apertures in said dielectric sheet; said metal electrodes located on opposite faces of said dielectric sheet; a pair of insulating cover plates having apertures therein which register with some of the apertures in said metal electrode, each one of said insulating cover plates being so located on one face of each metal electrode as to expose a portion of the metal; and a plurality of metal eyelets each one passing through some of the apertures in said dielectric sheet, metal electrodes, and cover plates to insulatingly bind them together to form a unit, the other apertures in said dielectric, electrodes and cover plates being arranged to permit the passage of terminal members of a meter therethrough, whereby an electrical connection is made directly from the terminal members of said meter to the exposed portion of said metal electrodes.

7. In combination, a radio frequency meter having terminal members protruding from the back of the meter casing, and a radio frequency by-pass condenser comprising a dielectric sheet having a plurality of apertures therein; a pair of metal electrodes each having a plurality of apertures therein which register with the apertures in said dielectric sheet, said metal electrodes being located on opposite faces of said dielectric sheet; a pair of insulating cover plates having apertures therein which register with some of the apertures in said metal electrodes, each one of said insulating cover plates being so located on one face of each metal electrode as to expose a portion of the metal; and a plurality of metal eyelets each one passing through some of the apertures in said dielectric sheet, metal electrodes, and cover plates to insulatingly bind them together to form a unit, the other apertures in said dielectric, electrodes and cover plates being arranged to permit the passage of terminal members of said meter therethrough, whereby an electrical connection is made directly from the terminal members of said meter to the exposed area of said metal electrodes.

ROY A. HENDERSON.

REFERENCES CITED

The following references are of record in the file of this patent:

UNITED STATES PATENTS

| Number | Name | Date |
|---|---|---|
| 1,607,856 | Yaxley | Nov. 23, 1926 |
| 2,334,660 | Webster | Nov. 16, 1943 |

FOREIGN PATENTS

| Number | Country | Date |
|---|---|---|
| 504,926 | Great Britain | Apr. 27, 1939 |